United States Patent
Ito

(10) Patent No.: US 7,621,067 B2
(45) Date of Patent: Nov. 24, 2009

(54) FISHING ROD

(75) Inventor: Koichi Ito, Shizuoka (JP)

(73) Assignee: Megabass General Baits, Inc., Shizuoka-ken (JP)

( * ) Notice: Subject to any disclaimer, the term of this patent is extended or adjusted under 35 U.S.C. 154(b) by 0 days.

(21) Appl. No.: 10/345,987

(22) Filed: Jan. 17, 2003

(65) Prior Publication Data

US 2003/0145509 A1 Aug. 7, 2003

(30) Foreign Application Priority Data

Feb. 7, 2002 (JP) .............................. 2002-031277
Apr. 23, 2002 (JP) .............................. 2002-121017

(51) Int. Cl.
*A01K 87/06* (2006.01)
(52) U.S. Cl. .......................................... 43/22
(58) Field of Classification Search ................ 43/20, 43/22, 18.1 R
See application file for complete search history.

(56) References Cited

U.S. PATENT DOCUMENTS

| | | | | | |
|---|---|---|---|---|---|
| 1,980,317 | A | * | 11/1934 | Clark | 43/22 |
| 2,230,229 | A | * | 2/1941 | Benson | 43/18.1 CT |
| 2,780,833 | A | * | 2/1957 | Macy | 425/76 |
| 4,050,179 | A | * | 9/1977 | Johnson | 43/22 |
| 4,578,890 | A | * | 4/1986 | Childre | 43/20 |
| 4,646,460 | A | * | 3/1987 | Rumbaugh | 43/22 |
| 5,199,207 | A | * | 4/1993 | Nakagawa | 43/22 |
| 5,291,683 | A | * | 3/1994 | Yamato | 43/22 |
| 6,105,301 | A | * | 8/2000 | Ohmura | 43/22 |
| 6,105,302 | A | * | 8/2000 | Yamamoto et al. | 43/23 |
| 6,357,165 | B1 | * | 3/2002 | Lu | 43/18.1 CT |
| 6,378,238 | B1 | * | 4/2002 | Lu | 43/20 |
| 6,438,890 | B1 | * | 8/2002 | Yamamoto et al. | 43/22 |

FOREIGN PATENT DOCUMENTS

| | | |
|---|---|---|
| JP | 2001-000082 | 1/2001 |
| JP | 2001-028975 A | 2/2001 |
| JP | 2001-037380 | 2/2001 |
| JP | 3079354 U | 5/2001 |

\* cited by examiner

*Primary Examiner*—Kurt Rowan
(74) *Attorney, Agent, or Firm*—Arent Fox LLP.

(57) ABSTRACT

A fishing rod including a pipe-shaped frame, a reel seat provided on an outer peripheral surface of the frame, a cylindrical front grip spirally attached to a front end of the reel seat, a rod inserted into a front end of the pipe-shaped frame, wherein the front grip is screwed into the reel seat side, to thereby make a hood on a back end of the front grip engage with a reel on the reel seat so as to fix the reel thereon, and wherein a front portion of the front grip is internally supported with the front grip being screwed into the reel seat side. This enables to prevent the rod and the front grip from becoming eccentric to each other.

6 Claims, 22 Drawing Sheets

(a)  (b)

US 7,621,067 B2

FISHING ROD

CROSS-REFERENCE TO RELATED APPLICATIONS

This application is based upon and claims priority of Japanese Patent Application Nos. 2002-031277, filed on Feb. 7, 2002 and 2002-121017, filed on Apr. 23, 2002, the contents being incorporated herein by reference.

BACKGROUND OF THE INVENTION

1. Field of the Invention

The present invention relates to a fishing rod in which a reel can be fixed on a reel seat.

2. Description of the Related Art

FIG. 25 shows one structural example of a conventional fishing rod. A reel seat 103 for mounting a reel 102 is connected to a front end of a rear grip 101 and a rod 105 is inserted into a front end of the reel seat 103. On an outer peripheral surface of the front end of the reel seat 103, a screw portion 103a is formed, by which a front grip 104 spirally attaches thereto.

The front grip 104 comprises a cylindrical body 107 in which a screw portion corresponding to the screw portion 103a on the reel seat 103 is formed on its inner peripheral surface, a front grip body 108 covering an outer peripheral surface of the cylindrical body 107, and a hood 109 connected to a back end surface of the cylindrical body 107 and the front grip body 108.

In thus-structured fishing rod, when fixing a reel 102, a back leg 102R is inserted into a hole formed in the reel seat 103 to mount the reel 102 on the reel seat 103. Then, when the front grip 104 is screwed into a reel seat 103 side (arrow X in the drawing), the hood 109 on the back end of the front grip 104 so engages with the reel seat 103 as to cover a front leg 102F of the reel 102, so that the reel 102 can be fixed on the reel seat 103.

In the fishing rod of the above-described conventional example, the reel 102 is firmly fixed after the hood 109 on the back end of the front grip 104 engages with the front leg 102F of the reel 102. Therefore, when the front grip 104 is further screwed therein, such force shown with an arrow R in the drawing operates on the front grip 104. This may sometimes cause the front grip 104 to become eccentric relative to a rod 105 as shown in FIG. 26.

In addition, as shown in FIG. 26, a gap 106 is formed between the rod 105 and an opening at the front end of the front grip 104. This may sometimes cause the rod 105 to become eccentric relative to the front grip 104 when a load operates on the rod 105.

When the rod 105 and the front grip 104 become eccentric to each other as described above, and if the front grip 104 has a metal ring member or the like at its front end, it is liable that the rod 105 may come into contact with the opening end on the front end of the front grip 104 to cause flaws thereon.

In addition, as shown in FIG. 25, in the conventional front grip 104, the hood 109 is connected to the back end surface of the cylindrical body 107 and the front grip body 108, so that it is liable that water may slip into its connection part.

SUMMARY OF THE INVENTION

The present invention is made in light of the above points. An object thereof is to improve performance around a front grip of a fishing rod, specifically, to prevent a rod and a front grip from becoming eccentric to each other and to provide a waterproof function around the front grip.

A fishing rod of the present invention includes: a pipe-shaped frame; a reel seat provided on an outer peripheral surface of the frame; a cylindrical front grip spirally attached to a front end of the reel seat; a rod inserted into a front end of the pipe-shaped frame, wherein the front grip is screwed into the reel seat side, to thereby make a hood on a back end of the front grip engage with a reel on the reel seat so as to fix the reel thereon; and wherein a front portion of the front grip is internally supported with the front grip being screwed into the reel seat side.

Another fishing rod of the present invention includes: a pipe-shaped frame; a reel seat provided on an outer peripheral surface of the frame; a cylindrical front grip spirally attached to a front end of the reel seat; a rod inserted into a front end of the pipe-shaped frame, wherein the front grip is screwed into the reel seat side, to thereby make a hood on a back end of the front grip engage with a reel on the reel seat so as to fix the reel thereon; and wherein the front grip includes a front grip body and a hood arranged on a back end of the front grip body, a ring member being arranged between the front grip body and the hood.

Another fishing rod of the present invention includes: a pipe-shaped frame; a reel seat provided on an outer peripheral surface of the frame; a hood spirally attached to the reel seat; a cylindrical front grip body connected to a front end of the reel seat; a rod inserted into a front end of the pipe-shaped frame, wherein the hood is screwed into the reel seat side, to thereby make the hood engage with a reel on the reel seat so as to fix the reel thereon; and wherein a ring member is connected to the back end of the front grip body.

DETAILED DESCRIPTION OF THE PREFERRED EMBODIMENTS

Hereinafter, preferred embodiments of a fishing rod of the present invention will be explained with reference to the drawings.

First Embodiment

Figure 1:
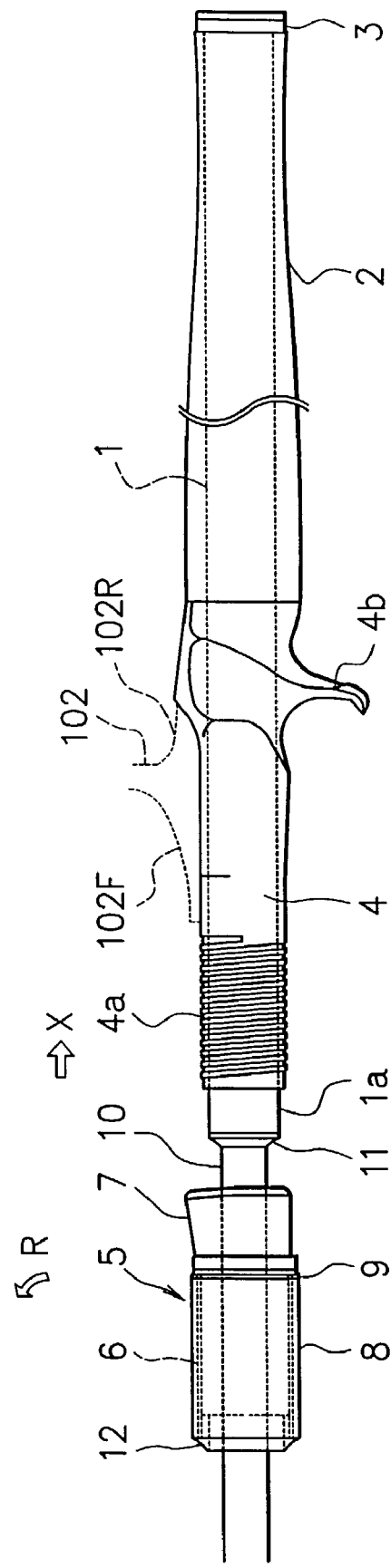
FIG. 1 is a partial side elevational view of a fishing rod of a first embodiment.
Figure 2:
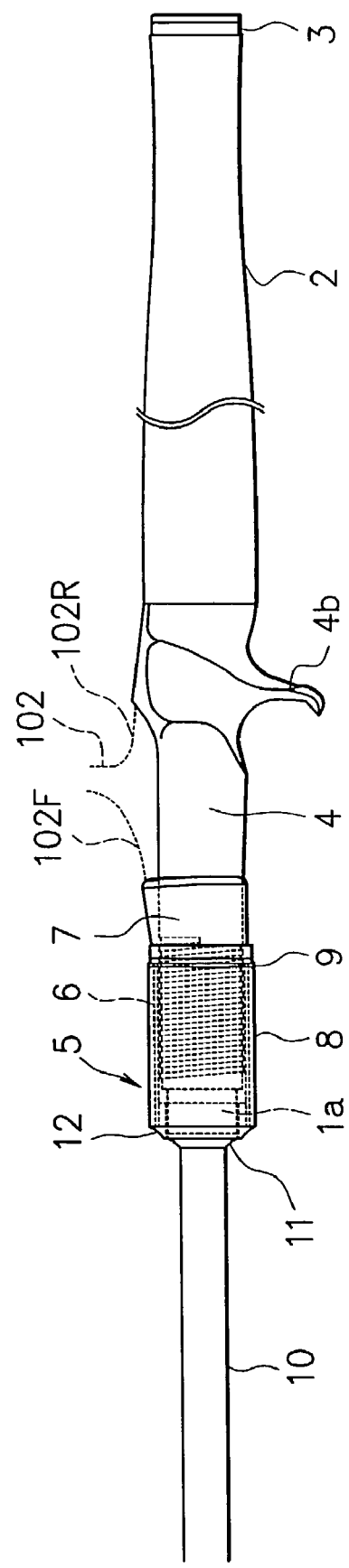
FIG. 2 is a partial side elevational view of the fishing rod of the first embodiment.

Hereinafter, a fishing rod of a first embodiment will be explained with reference to FIG. 1 to FIG. 7. As shown in FIG. 1 and FIG. 2, a rear grip 2 is provided on an outer peripheral surface of a pipe-shaped frame 1. The rear grip 2 is a part that a user grips, and cork, EVA rubber (foamed rubber), carbon, metal, urethane, and the like are used for its material. On a back end of the rear grip 2, an end cap 3 is provided to also function as a weight for striking an entire balance.

On the outer peripheral surface of the frame 1, there is so provided a reel seat 4 as to continue into a front end of the above-mentioned rear grip 2. The reel seat 4 functions as to mount a reel 102, and glass-mixed resin or the like is used for its material. On an outer peripheral surface of a front end of the reel seat 4, a screw portion 4a is formed, by which a later-mentioned cylindrical front grip 5 spirally attaches thereto. The reel seat 4 shown in FIG. 1 and FIG. 2 is a type in which a trigger handle 4b for hooking a finger thereon is integrally formed.

Figure 3:
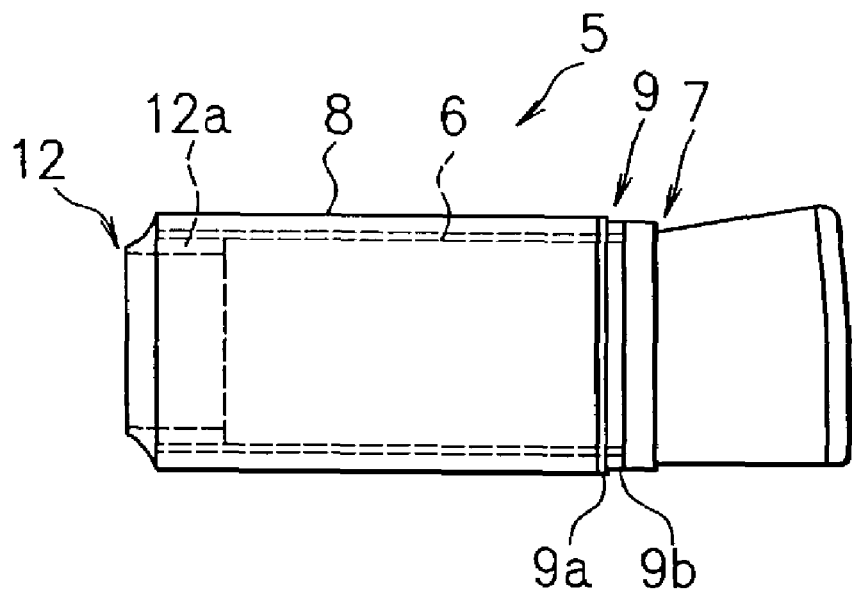
FIG. 3 is a side elevational view of a front grip 5.
Figure 4:
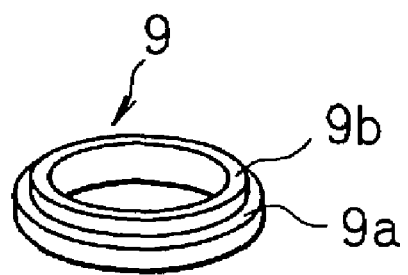
FIG. 4 is a perspective view of a ring member 9.
Figure 5:
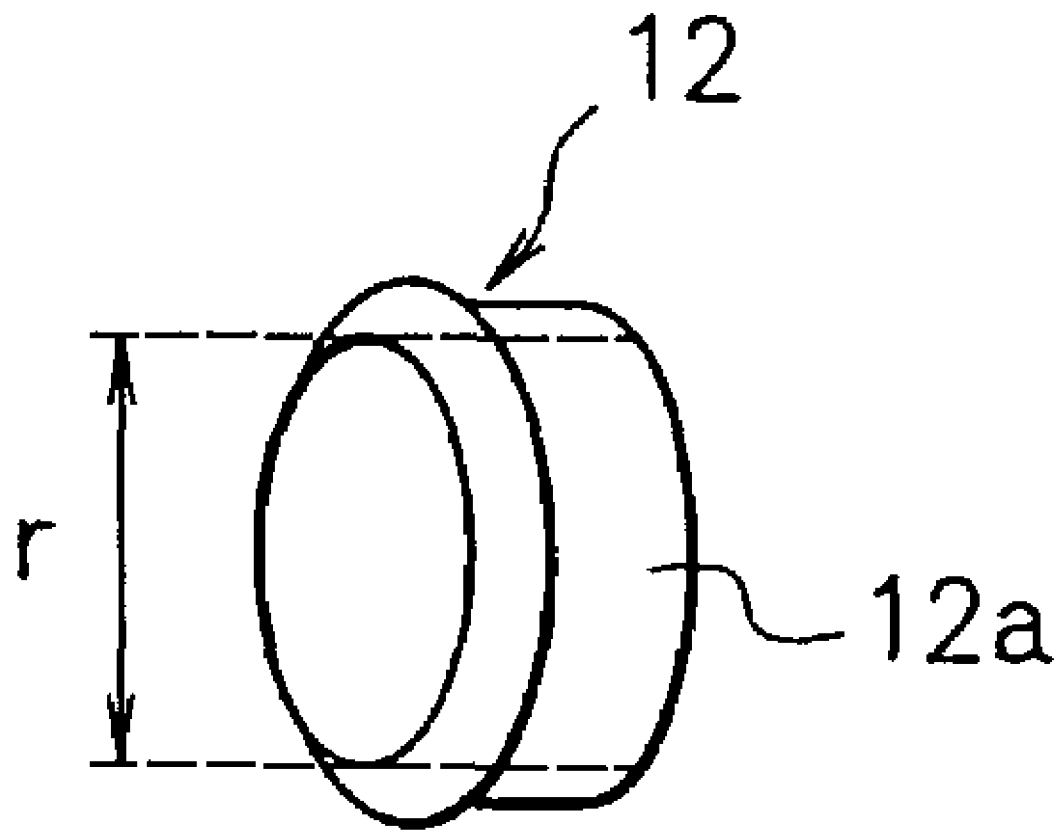
FIG. 5 is a perspective view of a ring member 12.

Referring to FIG. 3 to FIG. 5, the front grip 5 will be explained. The front grip 5 is so structured as to cover an outer peripheral surface of a cylindrical body 6 with a front grip body 8 as shown in FIG. 3. On an inner peripheral surface of the cylindrical body 6, a screw portion corresponding to the screw portion 4a on the reel seat 4 is formed. Similar to the above-mentioned rear grip 2, cork, EVA rubber, carbon, metal, urethane, and the like are used for the front grip body 8 as its material.

On an outer peripheral surface of a back end of the cylindrical body 6, there is so provided a metal ring member 9 as to continue into a back end of the front grip body 8. The ring member 9 is defined to have a shape comprising a first ring portion 9a whose outside diameter covers an end surface of the front grip body 8 and a second ring portion 9b whose outside diameter is smaller than that of the first ring portion 9a (refer to FIG. 4).

On the back end surface of the cylindrical body 6 and the ring member 9, there is connected a hood 7 with adhesion or the like.

A ring member 12 is provided at a front end opening of the cylindrical body 6. The ring member 12 comprises an inserting portion 12a for being inserted into the opening at the front end of the cylindrical body 6, the outer peripheral surface thereof being formed into a tapered shape (refer to FIG. 5). An inside diameter r of this ring member 12 is made substantially equal to an outside diameter of the frame 1.

Figure 7:
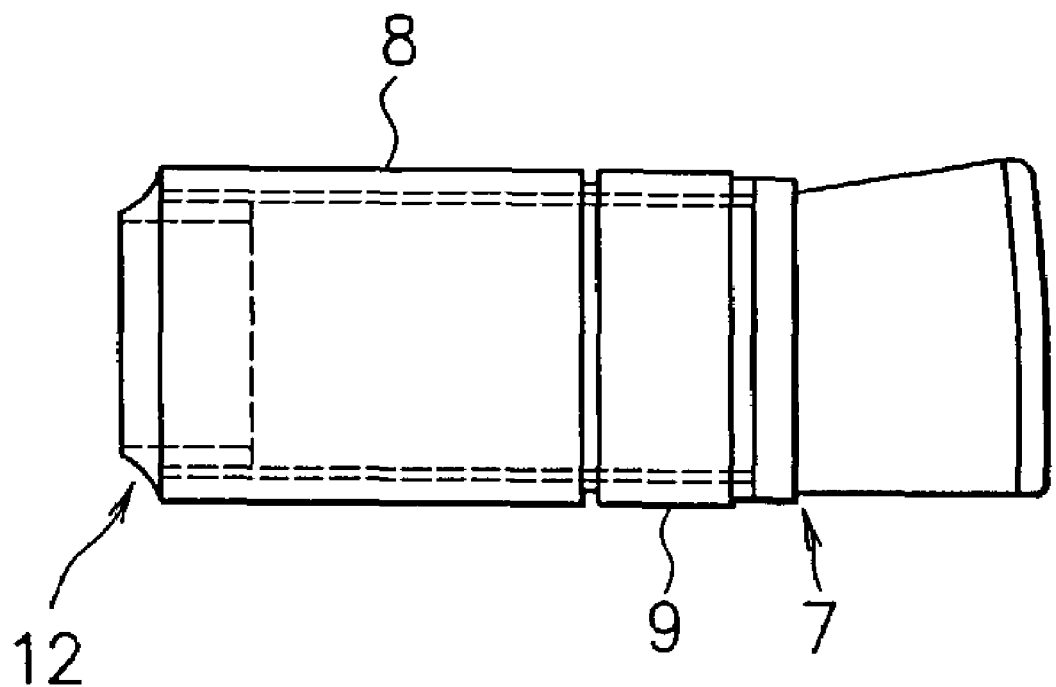
FIG. 7 is a view showing another example of the ring member 9.

In thus-structured front grip 5, since the ring member 9 is arranged between the front grip body 8 and the hood 7, such a waterproof effect as to prevent water from slipping into a gap between the front grip body 8 and the hood 7 can be obtained, which results in preventing deterioration of the material. Incidentally, any shapes may be applicable for the ring member 9 that exercises the waterproof effect. For example, the ring member 9 may have a shape lengthened in an axial direction as shown in FIG. 7.

Here, as shown in FIG. 1 and FIG. 2, the frame 1 protrudes from the front end of the reel seat 4 by predetermined length (refer to a symbol 1a in FIG. 1 and FIG. 2). Then, a rod 10 (blanks) is inserted into the front end of this frame 1.

A metal ring member 11 is coaxially connected to the front end of the frame 1. This ring member 11 is provided so as not to have water or the like slip into a gap between an inner peripheral surface of the frame 1 and an outer peripheral surface of the rod 10.

Figure 6:
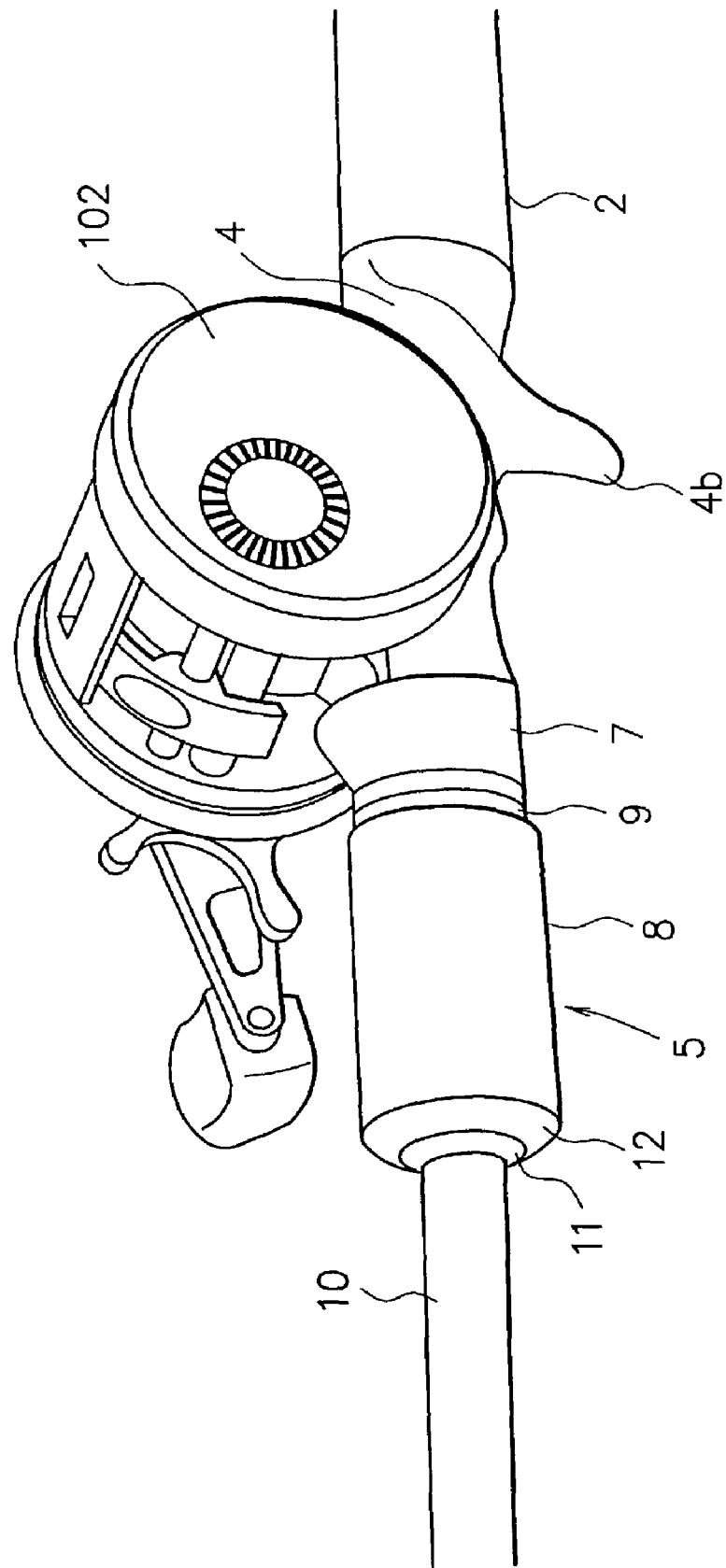
FIG. 6 is a partial perspective view of the fishing rod of the first embodiment.

In thus-structured fishing rod, when fixing a reel 102, a back leg 102R is inserted into a hole formed in the reel seat 4 to mount the reel 102 on the reel seat 4 as shown in FIG. 1. Then, when the front grip 5 is screwed into a reel seat 4 side (arrow X in the drawing), the hood 7 on the back end of the front grip 5 so engages with the reel seat 4 as to cover a front leg 102F of the reel 102 as shown in FIG. 2 and FIG. 6, so that the reel 102 can be fixed on the reel seat 4.

In the fishing rod of the above-described embodiment, a front end part of the frame 1 is caused to locate within the ring member 12 on the front end of the front grip 5 as shown in FIG. 2, with the reel 102 fixed on the reel seat 4 as described above. Since the inside diameter of the ring member 12 is formed substantially equal to the outside diameter of the frame 1 as described above, an inside diameter part of the ring member 12, which is inside the front end of the front grip 5, laps over the front end part of the frame 1. This allows the front portion of the front grip 5 to be internally supported by the frame 1. Therefore, even when the front grip 5 is further screwed therein in order to firmly fix the reel 102 and thus such force shown with an arrow R in FIG. 1 operates on the front grip 5, it is possible to prevent the front grip 5 from becoming eccentric relative to the rod 10.

In addition, even when a load operates on the rod 10, it can be prevented that the rod 10 becomes eccentric relative to the front grip 5.

As described above, since the rod 10 and the front grip 5 can be prevented from becoming eccentric to each other, it is not liable that the rod 10 comes into contact with the ring member 12 on the front end of the front grip 5.

Further, physical appearance thereof can present a heavy look since the first ring member 11 on the front end of the frame 1 is located between the rod 10 and the second ring member 12 on the front end of the front grip 5. Additionally, differentiating the first and second ring members 12 and 11 in color and material enables to provide a fishing rod having distinctive design.

Further, the rod 10 can be firmly supported by just a protruded portion of the frame 1, so that stiffness of a base end of the rod 10 is enhanced to improve durability of the rod 10 and also enable to pass force of a grip side directly onto a rod 10 side.

Incidentally, the shape and the structure of each part shown in the above-described embodiment are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

Figure 8:
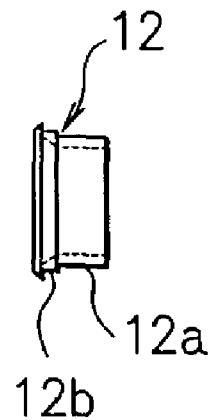
FIG. 8 is a view showing another example of the ring member 12.

For example, a shape of the second ring member 12 may not be limited to the shapes shown in FIG. 1 to FIG. 7. The second ring member 12 shown in FIG. 8 comprises an inserting portion 12a for being inserted into the opening at the front end of the cylindrical body 6 and a cylindrical portion 12b made one step higher than the inserting portion 12a, the outer peripheral surface thereof being formed into a tapered shape. The inside diameter of this second ring member 12 is formed to have substantially equal diameter to the outside diameter of the frame 1 at the inserting portion 12a, but, the inside diameter thereof gradually expands from the cylindrical portion 12b toward the front end.

Figure 9:
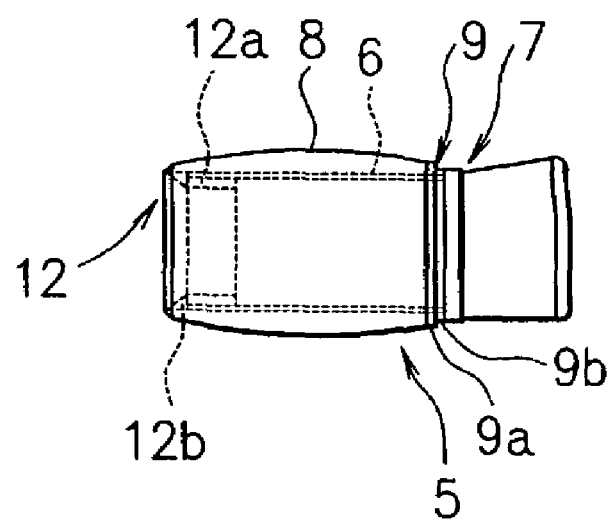
FIG. 9 is a side elevational view of the front grip 5 with the ring member 12 shown in FIG. 8 being mounted thereon.

On the other hand, as shown in FIG. 9, in a front end side of the front grip 5, a front end of the front grip body 8 is located ahead of the cylindrical body 6. When the ring member 12 is mounted thereon, an inserting portion 12a is inserted into the cylindrical body 6, while a cylindrical portion 12b is inserted into the front grip body 8 to continue into the cylindrical body 6.

Figure 10:
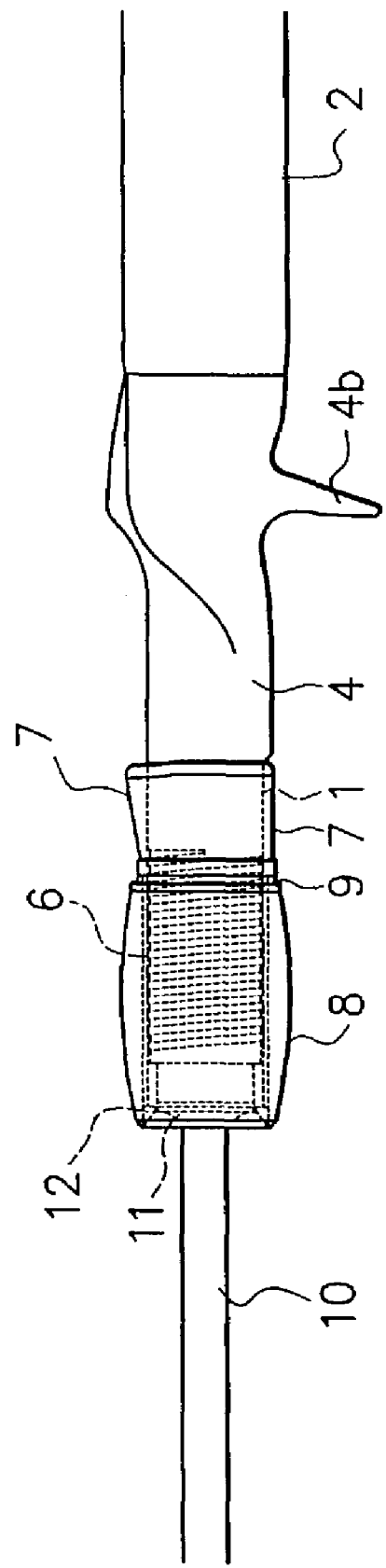
FIG. 10 is a partial side elevational view of a fishing rod having the front grip 5 shown in FIG. 9.

As shown in FIG. 10, when the front grip 5 is screwed therein with the use of this ring member 12, a front end position of the ring member 11 on the front end of the frame 1 and a front end position of the ring member 12 become substantially equal to each other. Therefore, design different from that of the ring member 11 protruding from the ring member 12 as shown in FIG. 1 to FIG. 7 can be formed.

Hereinafter, another structural example of the fishing rod of the first embodiment will be explained with reference to FIG. 11 to FIG. 17. In the following, differences from the fishing rod explained in FIG. 1 to FIG. 7 are mainly described and the same symbols will be used to designate the already explained components, so that the detailed description will be omitted.

Figure 11:
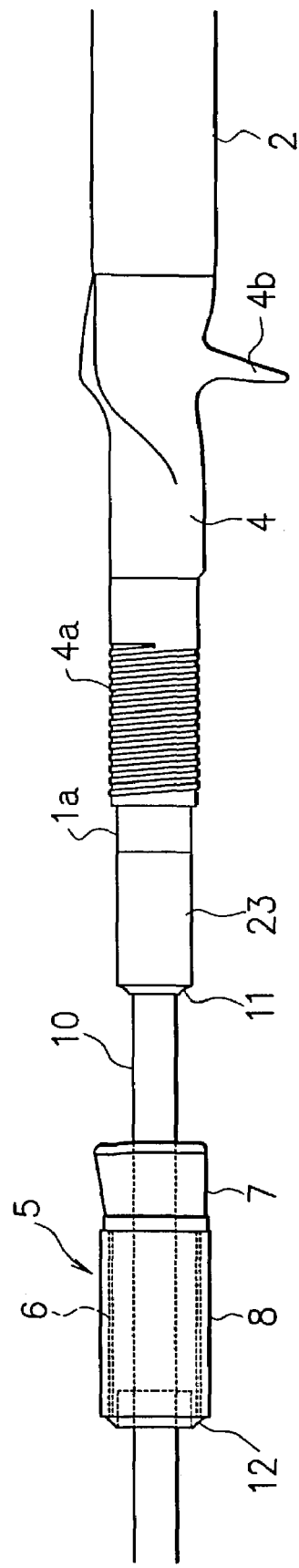
FIG. 11 is a partial side elevational view of a fishing rod of another example.
Figure 12:
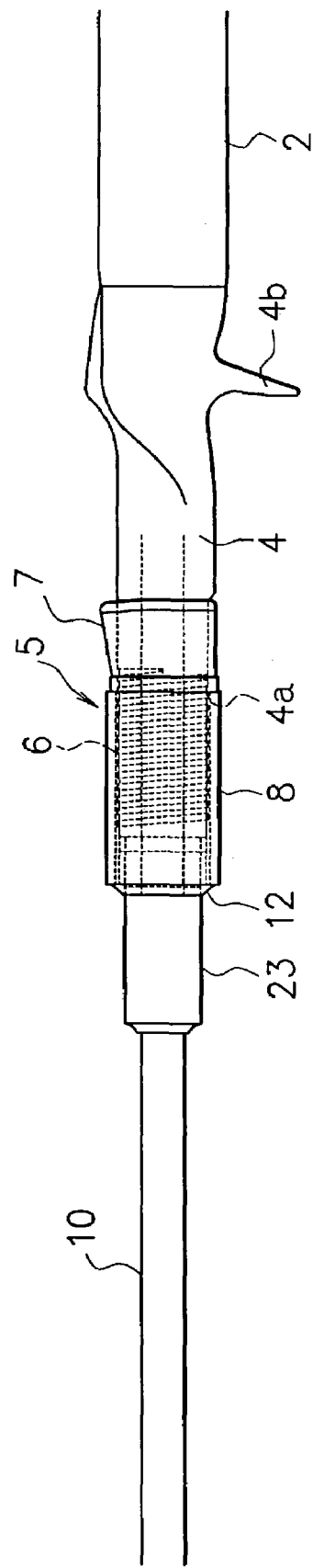
FIG. 12 is a partial side elevational view of a fishing rod of another example.

FIG. 11 and FIG. 12 show an example of providing a pipe-shaped member 23 on the outer peripheral surface of the rod 10 with the frame 1 protruding from the front end of the reel seat 4. The pipe-shaped member 23 has an equal diameter to the frame 1 and is connected to the front end of the frame 1. Incidentally, a metal ring member 11 is coaxially connected to the front end of the pipe-shaped member 23 so as not to have water or the like slip into a gap between an inner peripheral surface of the pipe-shaped member 23 and an outer peripheral surface of the rod 10.

Also in the fishing rod adopting a structure shown in FIG. 11 and FIG. 12, when the front grip 5 is screwed into the reel seat 4 side, the hood 7 on a back end of the front grip 5 so engages with the reel seat 4 as to cover a front leg 102F of a reel 102, so that the reel 102 can be fixed on the reel seat 4. This state allows the pipe-shaped member 23 to be located within the ring member 12 on the front end of the front grip 5, so that an inside diameter part of the ring member 12 that is inside the front end of the front grip 5 is supported by the pipe-shaped member 23. Specifically, a front portion of the front grip 5 is internally supported by the pipe-shaped member 23 so that the rod 10 and the front grip 5 can be prevented from becoming eccentric to each other.

Figure 13:
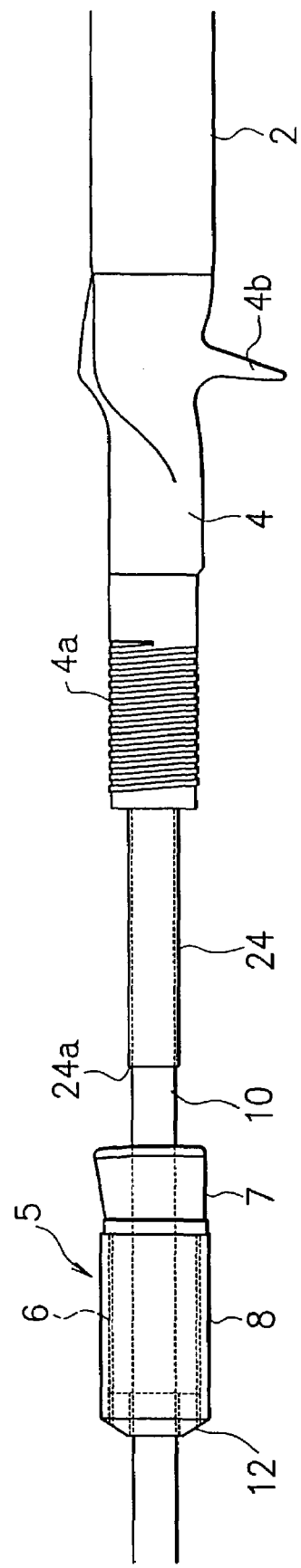
FIG. 13 is a partial side elevational view of a fishing rod of another example.
Figure 14:
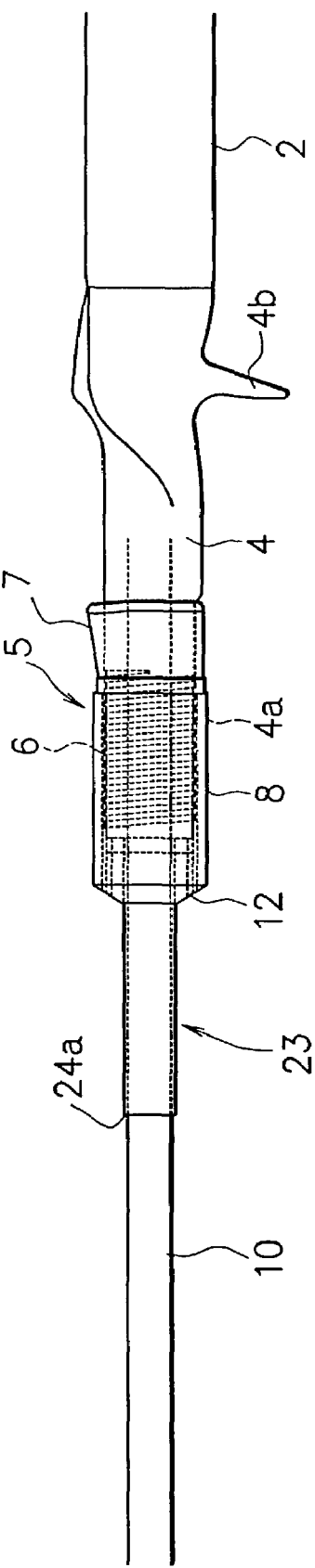
FIG. 14 is a partial side elevational view of a fishing rod of another example.

FIG. 13 and FIG. 14 show an example of providing a pipe-shaped member 24 on the outer peripheral surface of the rod 10 without protruding the frame 1 from the front end of the reel seat 4. The pipe-shaped member 24 is formed into such a thin shape as to have a slight step 24a relative to the rod 10 and connected to the front end of the frame 1. On the other hand, in the front grip 5, the inside diameter of the ring member 12 provided at a front end opening of the cylindrical body 6 is defined to be substantially equal to an outside diameter of the pipe-shaped member 24.

Also in the fishing rod adopting a structure shown in FIG. 13 and FIG. 14, when the front grip 5 is screwed into the reel seat 4 side, the hood 7 on a back end of the front grip 5 so engages with the reel seat 4 as to cover a front leg 102F of a reel 102, so that the reel 102 can be fixed on the reel seat 4. This state allows the pipe-shaped member 24 to be located within the ring member 12 on the front end of the front grip 5, so that an inside diameter part of the ring member 12 that is inside the front end of the front grip 5 is supported by the pipe-shaped member 24. Specifically, a front portion of the front grip 5 is internally supported by the pipe-shaped member 24 so that the rod 10 and the front grip 5 can be prevented from becoming eccentric to each other.

Figure 15:
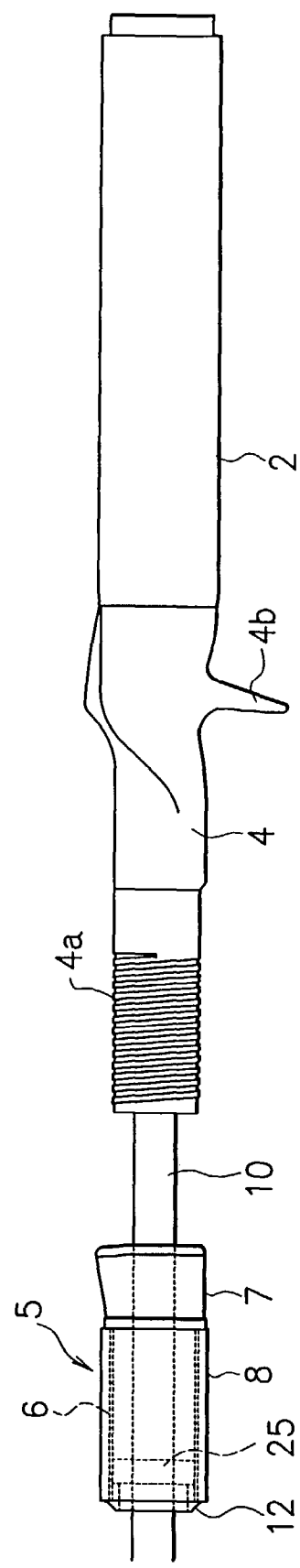
FIG. 15 is a partial side elevational view of a fishing rod of another example.
Figure 16:
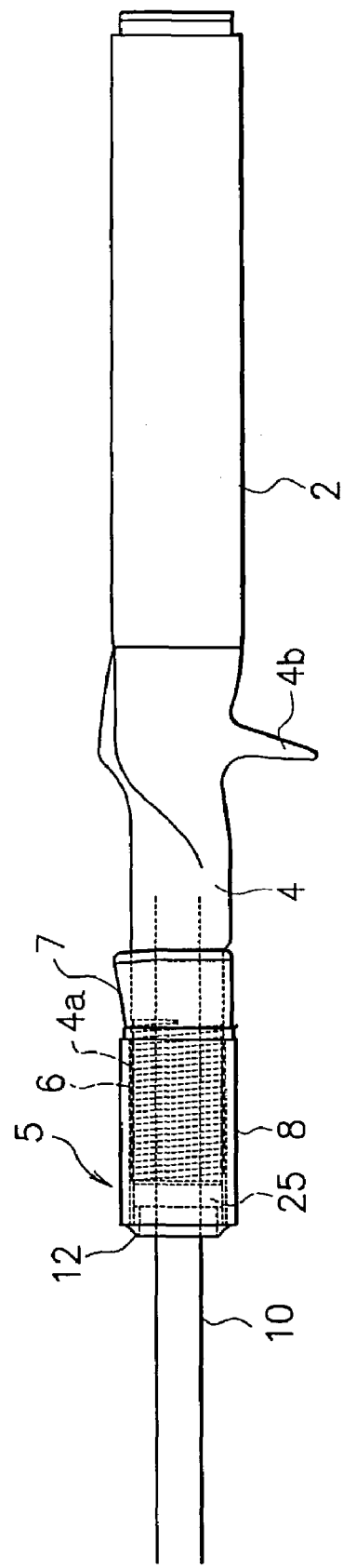
FIG. 16 is a partial side elevational view of a fishing rod of another example.
Figure 17:
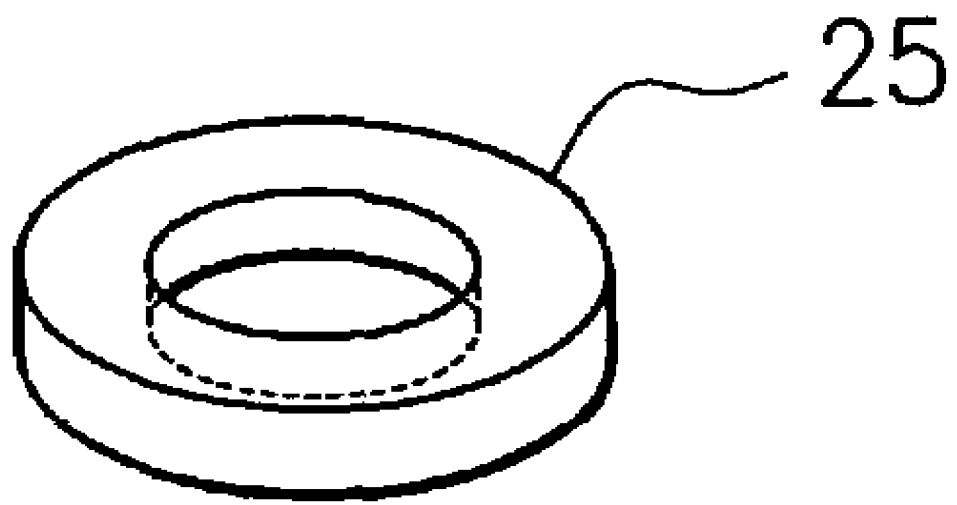
FIG. 17 is a perspective view of a ring-shaped member.

FIG. 15 to FIG. 17 show an example in which a ring-shaped member 25 is coaxially provided inside the front portion of the front grip 5. The ring-shaped member 25 has its outside diameter substantially equal to an inside diameter of the cylindrical body 6 of the front grip 5, while having its inside diameter substantially equal to the outside diameter of the rod 10 (refer to FIG. 17). As for material of the ring-shaped member 25, EVA rubber and the like are used in consideration to prevent the rod 10 from having flaws thereon that are caused by the ring-shaped member 25 sliding together with the rod 10. At the same time, such a structure is not applied that the frame 1 protrudes from the front end of the reel seat 4, or the pipe-shaped members 23 and 24 are connected to the front end of the frame 1.

Also in a fishing rod adopting a structure shown in FIG. 15 to FIG. 17, when the front grip 5 is screwed into the reel seat 4 side, the hood 7 on a back end of the front grip 5 so engages with the reel seat 4 as to cover the front leg 102F of the reel 102, so that the reel 102 can be fixed on the reel seat 4. At this time, the ring-shaped member 25 inside the front portion of the front grip 5 slides on an outer peripheral surface of the rod 10, so that an inside diameter part of the ring-shaped member 25 that is inside the front end of the front grip 5 is supported by the rod 10. Specifically, a front portion of the front grip 5 is internally supported by the rod 10 so that the rod 10 and the front grip 5 can be prevented from becoming eccentric to each other.

Second Embodiment

Figure 18:
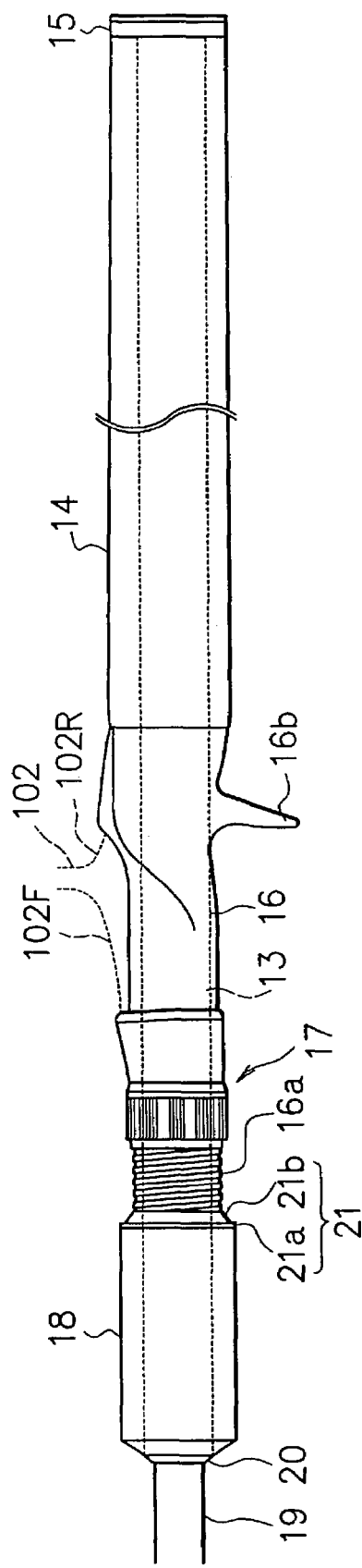
FIG. 18 is a partial side elevational view of a fishing rod of a second embodiment.

Hereinafter, a fishing rod of a second embodiment will be explained with reference to FIG. 18. As shown in FIG. 18, a rear grip 14 is provided on an outer peripheral surface of a pipe-shaped frame 13. The rear grip 14 is a part that a user grips, and cork, EVA rubber, carbon, metal, urethane, and the like are used for its material. On a back end of the rear grip 14, an end cap 15 is provided to also function as a weight for striking an entire balance.

On the outer peripheral surface of the frame 13, there is so provided a reel seat 16 as to continue into a front end of the above-mentioned rear grip 14. The reel seat 16 functions as to mount a reel 102, and glass-mixed resin or the like is used for its material. On an outer peripheral surface of a front end of the reel seat 16, a screw portion 16a is formed, by which a hood 17 spirally attaches thereto. The reel seat 16 shown in FIG. 18 is a type in which a trigger handle 16b for hooking a finger thereon is integrally formed.

Further, on the outer peripheral surface of the front end of the frame 13, a cylindrical front grip body 18 is so provided as to continue into the front end of the reel seat 16. Similar to the above-mentioned rear grip 14, cork, EVA rubber, carbon, metal, urethane, and the like are used for a front grip body 18 as its material.

The front end surface of the frame 13 and the front end surface of the front grip body 18 are formed to have substantially the same surface. And then a rod 19 is inserted into the front end of the frame 13.

A metal ring member 20 is coaxially connected to the front end of the frame 13. This ring member 20 is provided so as not to have water or the like slip into a gap between an inner peripheral surface of the frame 13 and an outer peripheral surface of the rod 19.

Here, a metal ring portion 21 is connected to a back end of the front grip body 18. The ring member 21 is defined to have a shape comprising a first ring portion 21a whose outside diameter covers an end surface of the front grip body 18 and a second ring portion 21b whose outside diameter is smaller than that of the first ring portion 21a, an outer peripheral surface of the second ring portion 21b being formed into a tapered shape.

In thus-structured fishing rod, when fixing a reel 102, a back leg 102R is inserted into a hole formed in the reel seat 16 to mount the reel 102 on the reel seat 16. Then, when the hood 17 is screwed into a reel seat 16 side, the hood 17 so engages with the reel seat 16 as to cover a front leg 102F of the reel 102 as shown in FIG. 18, so that the reel 102 can be fixed on the reel seat 16.

In the fishing rod of the embodiment described above, since the ring member 21 is connected to the back end of the front grip body 18, such a waterproof effect as to prevent water from slipping into a gap between the front grip body 18 and the reel seat 16 can be obtained, which results in preventing deterioration of the material.

Further, since the ring member 21 is connected to the back end of the front grip body 18, even when the hood 17 is overly loosened on the occasion of loosening the hood 17, it is possible to prevent a tip of the hood 17 from directly hitting against the back end of the front grip body 18. This enables to obtain a front grip protective function that is to prevent such breakage that the front grip body 18 gets chipped.

Incidentally, the shape and the structure of each part shown in the above-described embodiment are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

Figure 19:
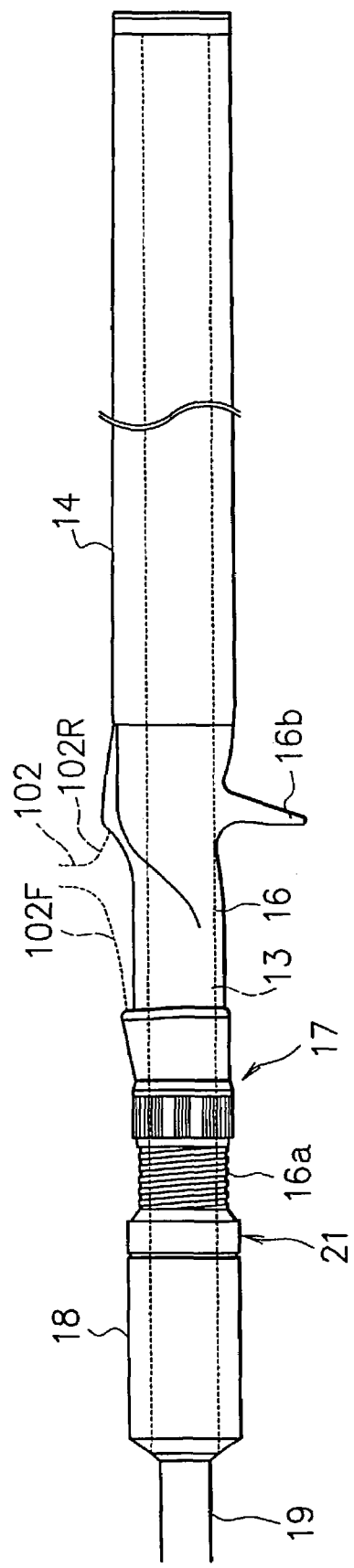
FIG. 19 is a partial side elevational view of another fishing rod of another example.
Figure 20:
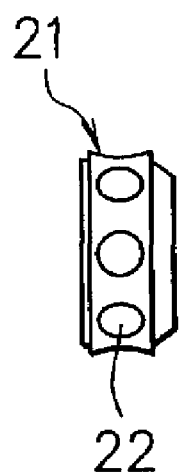
FIG. 20 is a view showing another example of a ring member 21.
Figure 21:
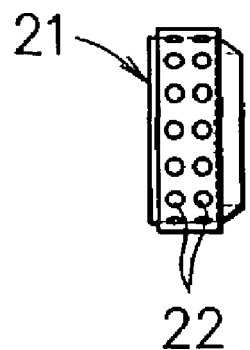
FIG. 21 is a view showing another example of the ring member 21.

For example, a shape of the ring member 21, which exercises the waterproof effect and the front grip protective effect, may be lengthened in a coaxial direction as shown in FIG. 19. Additionally, as shown in FIG. 20 and FIG. 21, a plurality of dimples 22 may be formed on the outer peripheral surface of the ring member 21.

Figure 22:
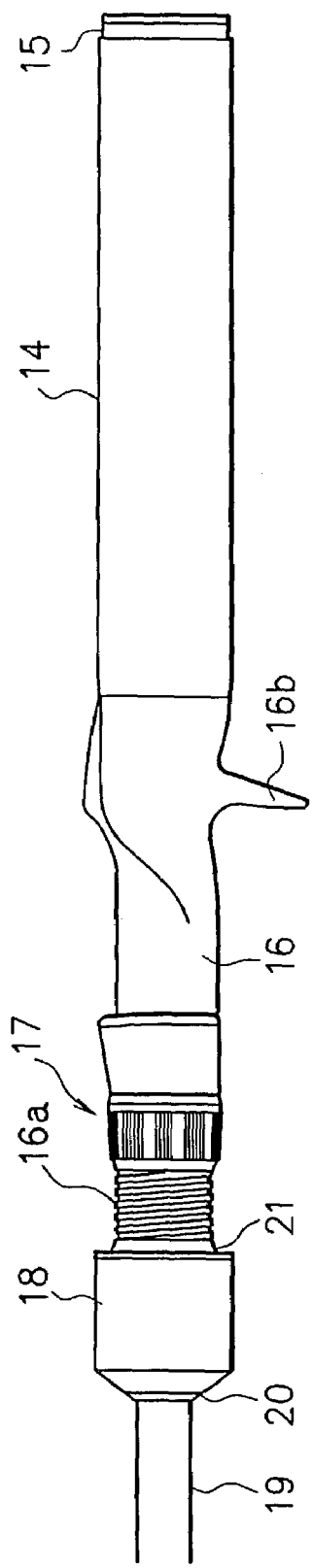
FIG. 22 is a partial side elevational view of another fishing rod of another example.

In a type shown in FIG. 22, an axial length of the front grip body 18 is shortened.

Figure 23:
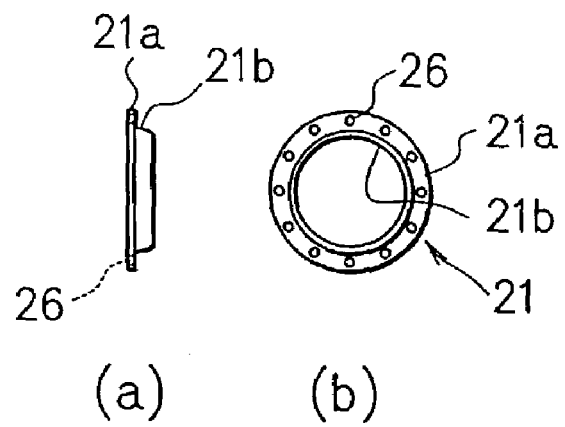
FIG. 23 is a view showing another example of the ring member 21.
Figure 24:
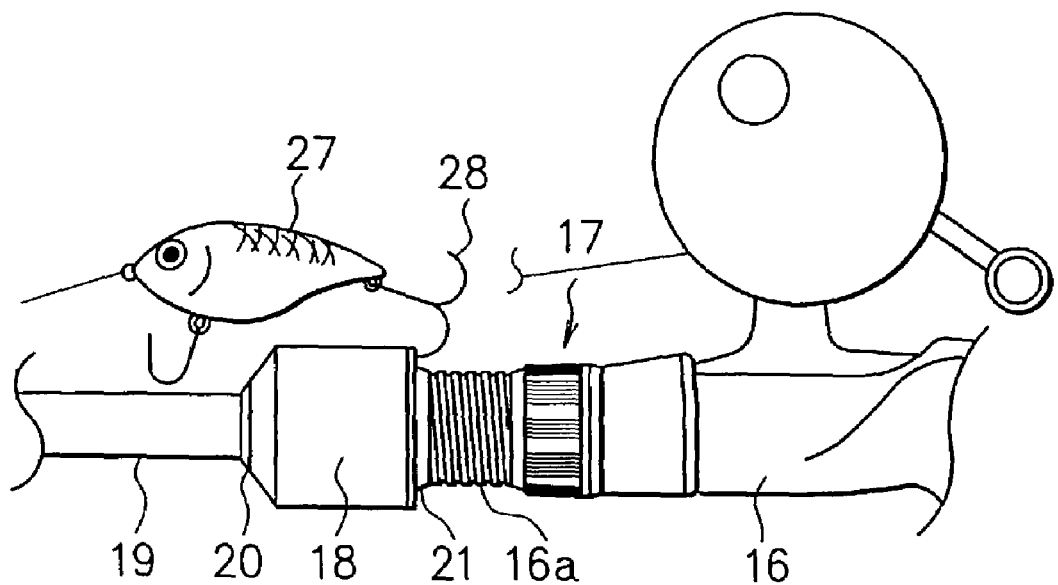
FIG. 24 is a view showing a state in which a hook 28 is hooked on a hole 26 in the ring member 21.
Figure 25:
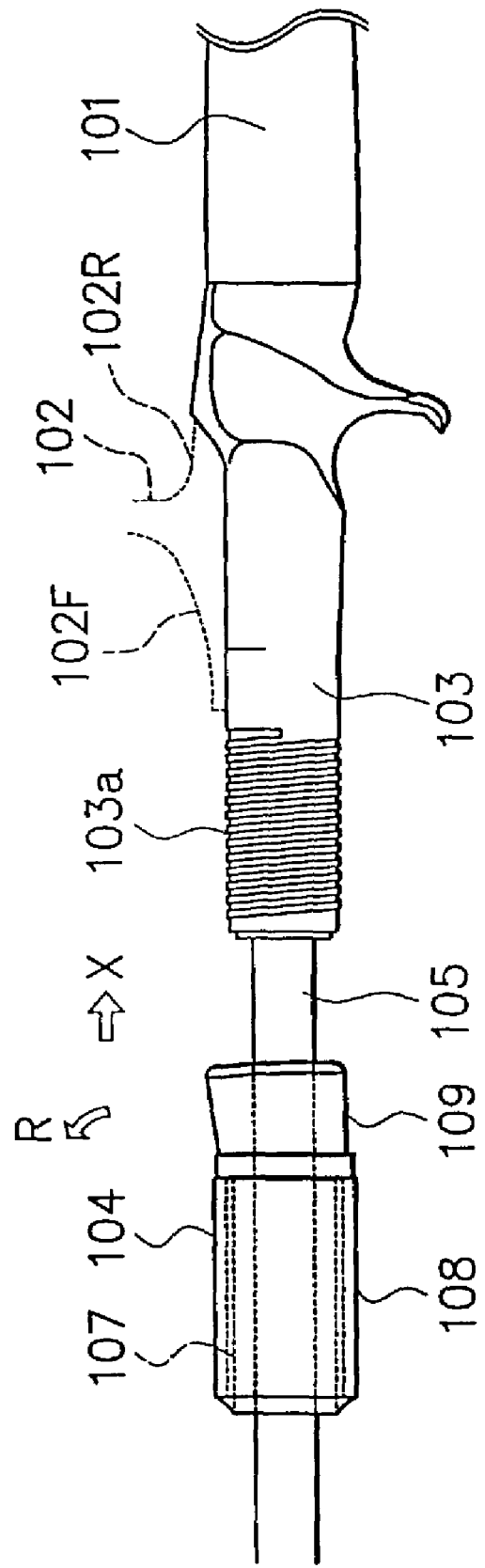
FIG. 25 is a partial side elevational view of a conventional fishing rod.
Figure 26:
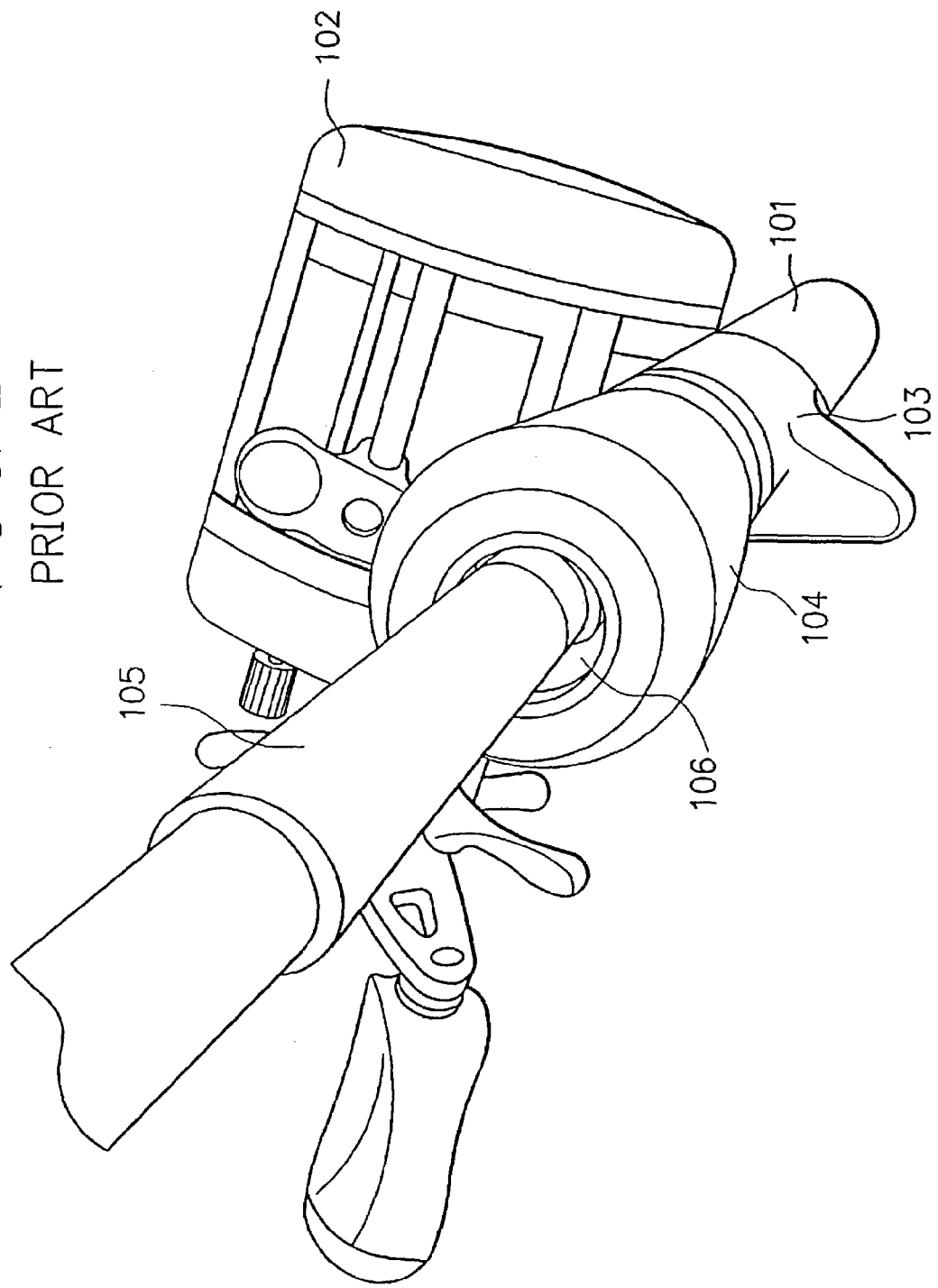
FIG. 26 is a partial perspective view of the conventional fishing rod.

As shown in FIG. 23, the ring member 21 is defined to have a shape comprising an annular thin-shaped first ring portion 21a whose outside diameter covers an end surface of the front grip body 18 and a second ring portion 21b whose outside diameter is smaller than that of the first ring portion 21a, an outer peripheral surface of the second ring portion 21b being formed into a tapered shape. Then, a plurality of holes 26 is formed in the first ring portion 21a. Forming such holes 26 allows a hook 28 of a fishing lure 27 to be hooked on the hole 26 when carrying a fishing rod as shown in FIG. 24, which is highly convenient.

As described above, a rod and a front grip can be prevented from becoming eccentric to each other. Additionally, a waterproof function can be applied around the front grip. This results in improving performance around the front grip of a fishing rod.

What is claimed is:

1. A fishing rod, comprising:
   a pipe-shaped frame;
   a reel seat provided on an outer peripheral surface of said frame;
   a cylindrical front grip spirally attached to a front end of said reel seat, the cylindrical front grip including a front grip body, a hood mounted at a rear end of the front grip body and a ring member inserted into an opening of a front end of the front grip body;
   a rod inserted into a front end of said pipe-shaped frame and penetrated through the reel seat and the cylindrical front grip,
   wherein said front grip is screwed into a reel seat side, to thereby make the hood on the rear end of said front grip engage with a reel on said reel seat so as to fix the reel thereon,
   wherein a front portion of said front grip is internally supported with said front grip being screwed into said reel seat side,
   wherein a pipe-shaped member is provided directly on an outer peripheral surface of said rod, such that when the front grip is screwed into said reel seat, the inside of the front end of said front grip directly engages said pipe-shaped member,
   wherein the pipe-shaped member includes a metal ring member on a front end thereof to prevent fluids from entering a gap between the frame and the rod, and
   wherein an inside diameter part of said ring member directly engages said pipe-shaped member.

2. The fishing rod according to claim 1, wherein the pipe-shaped member is connected to the front end of the pipe-shaped frame.

3. The fishing rod according to claim 1, wherein the ring member directly engages the front end of the front grip.

4. The fishing rod according to claim 1, wherein the ring member is inserted into the front grip.

5. The fishing rod according to claim 1, wherein the front grip body is provided on an outer peripheral surface of the front grip.

6. The fishing rod according to claim 5, wherein the front grip body is a material selected from the group consisting of cork, foamed rubber, carbon, metal, and urethane.

* * * * *